United States Patent
Ishikawa et al.

(10) Patent No.: US 6,930,460 B2
(45) Date of Patent: Aug. 16, 2005

(54) LOAD DRIVER WITH POWER STORAGE UNIT

(75) Inventors: Tetsuhiro Ishikawa, Nishikamo-gun (JP); Hiroshi Sugiura, Chigasaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 147 days.

(21) Appl. No.: 10/351,496

(22) Filed: Jan. 27, 2003

(65) Prior Publication Data

US 2003/0146726 A1 Aug. 7, 2003

(30) Foreign Application Priority Data

Feb. 5, 2002 (JP) ......................... 2002-028242

(51) Int. Cl.⁷ ............................. H02P 1/00; H02P 3/00; H02P 5/00; H02P 7/00
(52) U.S. Cl. ........................ 318/442; 318/108; 318/109; 318/441
(58) Field of Search ................................. 318/800, 808, 318/440–442, 105–109, 765, 801, 803, 805, 812

(56) References Cited

U.S. PATENT DOCUMENTS

| | | | | |
|---|---|---|---|---|
| 4,788,493 A | * | 11/1988 | Liptak ..................... | 324/140 R |
| 5,099,186 A | | 3/1992 | Rippel et al. | |
| 5,225,712 A | * | 7/1993 | Erdman ....................... | 290/44 |
| 5,549,172 A | * | 8/1996 | Mutoh et al. ............... | 180/65.1 |
| 5,780,980 A | * | 7/1998 | Naito .......................... | 318/139 |
| 5,801,498 A | * | 9/1998 | Kusano et al. .............. | 318/139 |
| 5,907,191 A | * | 5/1999 | Sasaki et al. ................. | 290/19 |
| 5,942,862 A | * | 8/1999 | Yamada et al. ................ | 318/9 |
| 5,973,463 A | * | 10/1999 | Okuda et al. ............... | 318/430 |
| 5,992,950 A | * | 11/1999 | Kumar et al. ............... | 303/151 |
| 6,066,928 A | | 5/2000 | Kinoshita et al. | |
| 6,137,704 A | | 10/2000 | Ito et al. | |
| 6,320,775 B1 | | 11/2001 | Ito et al. | |
| 6,486,632 B2 | * | 11/2002 | Okushima et al. .......... | 318/599 |
| 6,518,736 B2 | * | 2/2003 | Sasaki et al. ................. | 322/16 |
| 6,534,208 B1 | * | 3/2003 | Zinser .......................... | 429/9 |
| 6,554,088 B2 | * | 4/2003 | Severinsky et al. ........ | 180/65.2 |
| 6,630,804 B2 | * | 10/2003 | Moriya et al. ................ | 318/85 |
| 6,661,109 B2 | * | 12/2003 | Fukasaku et al. .......... | 290/40 C |
| 6,683,389 B2 | * | 1/2004 | Geis .......................... | 290/40 C |
| 6,725,134 B2 | * | 4/2004 | Dillen et al. .................. | 701/19 |

FOREIGN PATENT DOCUMENTS

| | | | | |
|---|---|---|---|---|
| EP | 1034968 A1 | * | 9/2000 | ........... B60L/11/12 |
| EP | 1168593 A2 | * | 1/2002 | ........... H02P/7/628 |
| JP | B2 3141779 | | 12/2000 | |
| JP | A 2001-128305 | | 5/2001 | |

* cited by examiner

*Primary Examiner*—David Martin
*Assistant Examiner*—Renata McCloud
(74) *Attorney, Agent, or Firm*—Oliff & Berridge, PLC

(57) ABSTRACT

In a load driving arrangement, electric power is supplied from an auxiliary battery to a main power supply when the power stored by charging in the main power supply is scarce at the startup of the system. The power is supplied to the main power supply by closing relays to connect the auxiliary battery to the neutral point of an auxiliary motor, operating a switching transistor of a bottom arm of an auxiliary-related inverter based on a command from a control circuit, stepping up the voltage from the auxiliary battery by using a coil of the auxiliary motor as a reactor, and supplying the step-up voltage to the main power supply thereby charging the main power supply. At this time, a drive-related inverter and a DC/DC converter are stopped. When the main power supply is charged to a sufficient degree, the relays are opened to drive each load. Accordingly, the load driving arrangement achieves the function of charging the main power supply at low cost when the power stored therein is scarce at the system startup.

8 Claims, 5 Drawing Sheets

LOAD DRIVER WITH POWER STORAGE UNIT

BACKGROUND OF THE INVENTION

1. Field of the Invention

The present invention relates to a load driver, a charging control method of a power storage unit in the load driver, and a computer-readable recording medium with a program recorded thereon for allowing a computer to execute charging control. In particular, the present invention relates to a load driver with a power storage unit serving as a main power supply of a hybrid or electric vehicle, the load driver having a mechanism of charging the power storage unit when its power stored by charging is scarce at the startup of the system, and further relates to a charging control method of the power storage unit in the load driver and a computer-readable recording medium with a program recorded thereon for allowing a computer to execute charging control.

2. Description of the Background Art

Against the background of the currently burning issues concerning energy conservation and environment, the hybrid vehicle (hereinafter HV) and the electric vehicle (hereinafter EV) are receiving growing attention. These vehicles have such a power storage unit as power capacitor and secondary battery mounted thereon that is used as a power source for driving a motor and accordingly moving the vehicle.

When the power storage unit (hereinafter referred to as main power supply) serving as a power source of the vehicle is discharged to a considerable degree and accordingly the remaining capacity of the main power supply decreases, it is required to charge the main power supply by any appropriate means. In particular, if a power capacitor with a large amount of self-discharge is employed as the main power supply, it is likely, after a long nonuse period, that the system cannot be started due to shortage of the output voltage of the main power supply.

A long nonuse period of the vehicle, for example, decreases the power stored, by charging, in the main power supply, and thus makes it impossible to start the system. One conventional method employed in such a case for charging the main power supply converts an AC voltage from an external commercial AC power supply into a DC voltage by an external charger in order to charge the main power supply.

The above-mentioned vehicles include, in addition to the main power supply, an auxiliary battery for supplying electric power to auxiliary loads such as lamp, small-sized motor and control circuit. The auxiliary battery corresponds to an alternator of the conventional engine-driven vehicle, however, the EV has no engine serving as a source of mechanical energy and the engine of the HV is not always operated because of the need for improvement of fuel consumption or because of the action of an idling stop system when the vehicle is stopped. Then, the auxiliary battery of the EV and HV is supplied with electric power from the main power supply (and also from a drive motor by power generation from regenerative braking when the vehicle is braked).

The above-mentioned auxiliary loads all operate at a low voltage from ten to twenty volts and accordingly the auxiliary battery outputs a voltage of a corresponding level. On the other hand, the main power supply serving as a power source of the vehicle usually outputs a voltage of a few hundreds of volts. In general, therefore, a DC/DC converter is provided for stepping down the voltage supplied from the high-voltage main power supply into the voltage of the auxiliary, in order to charge the auxiliary battery.

Japanese Patent No. 3,141,779 discloses a motor drive system for a vehicle of the series hybrid type that has such a DC/DC converter as described above. Specifically, an auxiliary battery is connected via the DC/DC converter to a main battery, and the DC/DC converter steps down a power supply voltage which is output from the main battery into an appropriate voltage of the auxiliary to apply the resultant voltage between positive and negative terminals of the auxiliary battery.

Suppose that a system includes such a DC/DC converter connecting the main power supply and the auxiliary battery and the system cannot be started due to a lowered power-supply ability of the main power supply after a long nonuse period. In such a case, the auxiliary battery may charge the main power supply via the DC/DC converter. However, the DC/DC converter is provided to the above-described system for the purpose of stepping down the high-voltage electric power supplied from the main power supply or the high-voltage electric power generated by the drive motor in the regenerative braking, into an appropriate voltage of the auxiliary loads that is supplied to the auxiliary battery. In general, therefore, the DC/DC converter of this type has no step-up function. Then, a conventional method for charging the main power supply by means of the auxiliary battery uses a separate step-up converter.

The method, as discussed above, of using the external charger for converting the AC voltage of the external commercial power supply into the DC voltage to charge the main power supply, requires the external charger having the AC/DC converting function, and thus the whole cost cannot be reduced.

The above-discussed system of providing the DC/DC converter between the main power supply and the auxiliary battery also requires a separate step-up converter, and thus reduction of the whole cost is impossible, as well.

Further, if a DC/DC converter having both of the step-up and step-down functions is used for allowing the auxiliary battery to charge the main power supply by controlling the step-up function when the power stored in the main power supply by charging decreases, the multifunctional DC/DC converter having the step-up and step-down functions adds the cost.

SUMMARY OF THE INVENTION

The present invention has accordingly been made to solve the problems as described above. One object of the present invention is therefore to provide a load driver for achieving, at low cost, the function of supplying power from the auxiliary battery to the main power supply when the power stored in the main power supply by charging is scarce at the startup of the system.

Another object of the present invention is to provide a charging control method for controlling charging of the power storage unit in the load driver for achieving, at low cost, the function of supplying power from the auxiliary battery to the main power supply when the power stored in the main power supply by charging is scarce at the startup of the system.

Still another object of the present invention is to provide a computer-readable recording medium with a program recorded thereon for allowing a computer to execute control of charging of the power storage unit in a load driver for achieving, at low cost, the function of supplying power from the auxiliary battery to the main power supply when the power stored in the main power supply by charging is scarce at the startup of the system.

According to the present invention, a load driver includes an AC motor, a first power supply outputting a first voltage which is a DC voltage, a second power supply outputting a second voltage which is a DC voltage, an inverter receiving the first voltage, converting the first voltage into an AC voltage, outputting the AC voltage to the AC motor, and driving the AC motor, a converter stepping down the first voltage, outputting the step-down voltage to the second power supply and charging the second power supply, and a control circuit. When the first voltage is lower than a predetermined voltage, the second voltage is supplied to a coil of the AC motor, and the control circuit controls the inverter to step up the second voltage by the coil of the AC motor and the inverter, output the step-up voltage to the first power supply and charge the first power supply, and stops the converter.

Preferably, the AC motor includes a plurality of coils each having one end and the other end, and the second voltage is supplied to a neutral point constituted of respective one-ends, connected together, of all of the coils.

Preferably, the AC motor includes a plurality of coils each having one end and the other end, respective one-ends of all of the coils being connected together to constitute a neutral point, and the second voltage is supplied to the other end of one of the coils.

Preferably, the load driver further includes another inverter receiving the first voltage, converting the first voltage into another AC voltage, outputting another AC voltage to and driving a vehicle-drive motor for moving a vehicle. The AC motor is a motor for auxiliary components and, when the first voltage is lower than the predetermined voltage, the control circuit further stops that another inverter.

Preferably, the AC motor includes a first AC motor and a second AC motor. The inverter includes a first inverter receiving the first voltage, converting the first voltage into a first AC voltage, outputting the first AC voltage to the first AC motor and driving the first AC motor, and a second inverter receiving the first voltage, converting the first voltage into a second AC voltage, outputting the second AC voltage to the second AC motor and driving the second AC motor. When the first voltage is lower than the predetermined-voltage, the positive electrode of the second power supply is connected to a first neutral point constituted of respective one-ends, connected together, of all coils of the first AC motor, and the negative electrode of the second power supply is connected to a second neutral point constituted of respective one-ends, connected together, of all coils of the second AC motor, and the control circuit controls the first inverter to step up the second voltage by a coil of the first AC motor and the first inverter to output the step-up voltage to the first power supply, and charge the first power supply.

Preferably, the first power supply is one of a power capacitor and a secondary battery.

Preferably, when the first power supply needs to be charged at system startup, the control circuit controls the inverter to step up the second voltage by the coil of the AC motor and the inverter, output the step-up voltage to the first power supply and charge the first power supply, and stops the converter.

According to the present invention, a method is provided of controlling charging of a power storage unit in a load driver, the load driver driving a load by a first voltage supplied from a first DC power supply, and the first DC power supply being charged by a second voltage supplied from a second DC power supply which is charged by stepping down the first voltage. The method includes a first step of making a change in power supply route, when the first DC power supply needs to be charged, from a power supply route to step down the first voltage and charge the second DC power supply, to another power supply route to step up the second voltage and charge the first DC power supply, a second step of receiving and stepping up the second voltage, and a third step of outputting the step-up second voltage to the first DC power supply to charge the first DC power supply.

Preferably, the second voltage is supplied to a coil of an AC motor driven by the first voltage and, in the second step, the second voltage is stepped up by controlling switching of at least one switching transistor of an inverter driving the AC motor, by the coil of the AC motor and the inverter.

According to the present invention, a computer-readable recording medium is provided. The recording medium has a program recorded thereon for a computer to execute control of charging of a power storage unit in a load driver, the load driver driving a load by a first voltage supplied from a first DC power supply, and the first DC power supply being charged by a second voltage supplied from a second DC power supply which is charged by stepping down the first voltage. The computer executes a first step of making a change in power supply route, when the first DC power supply needs to be charged, from a power supply route to step down the first voltage and charge the second DC power supply, to another power supply route to step up the second voltage and charge the first DC power supply, a second step of receiving and stepping up the second voltage, and a third step of outputting the step-up second voltage to the first DC power supply to charge the first DC power supply.

Preferably, the second voltage is supplied to a coil of an AC motor driven by the first voltage and, in the second step, the second voltage is stepped up by controlling switching of at least one switching transistor of an inverter driving the AC motor, by the coil of the AC motor and the inverter.

With the above-described load driver and the method of controlling charging of a power storage unit of the load driver, according to the present invention, when the electric power stored by charging in the main power supply of the HV or EV is insufficient at the system startup, the auxiliary battery is connected to the neutral point of the auxiliary motor and to the negative electrode of the main power supply and accordingly the auxiliary-related inverter uses a coil of the auxiliary motor to step up the output voltage from the auxiliary battery thereby charge the main power supply. In this way, the main power supply is charged at low cost without the need for a separate step-up unit or a high-performance step-up/step-down DC/DC converter.

Moreover, with the above-described load driver and the method of controlling charging of a power storage unit of the load driver, according to the present invention, a single-phase AC voltage supplied from an external commercial power supply is converted into a DC voltage by two sets of auxiliary-related inverters and auxiliary motors to step up the DC voltage and thereby charge the main power supply. In this way, the main power supply is charged at low cost without the need for a separate converter.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
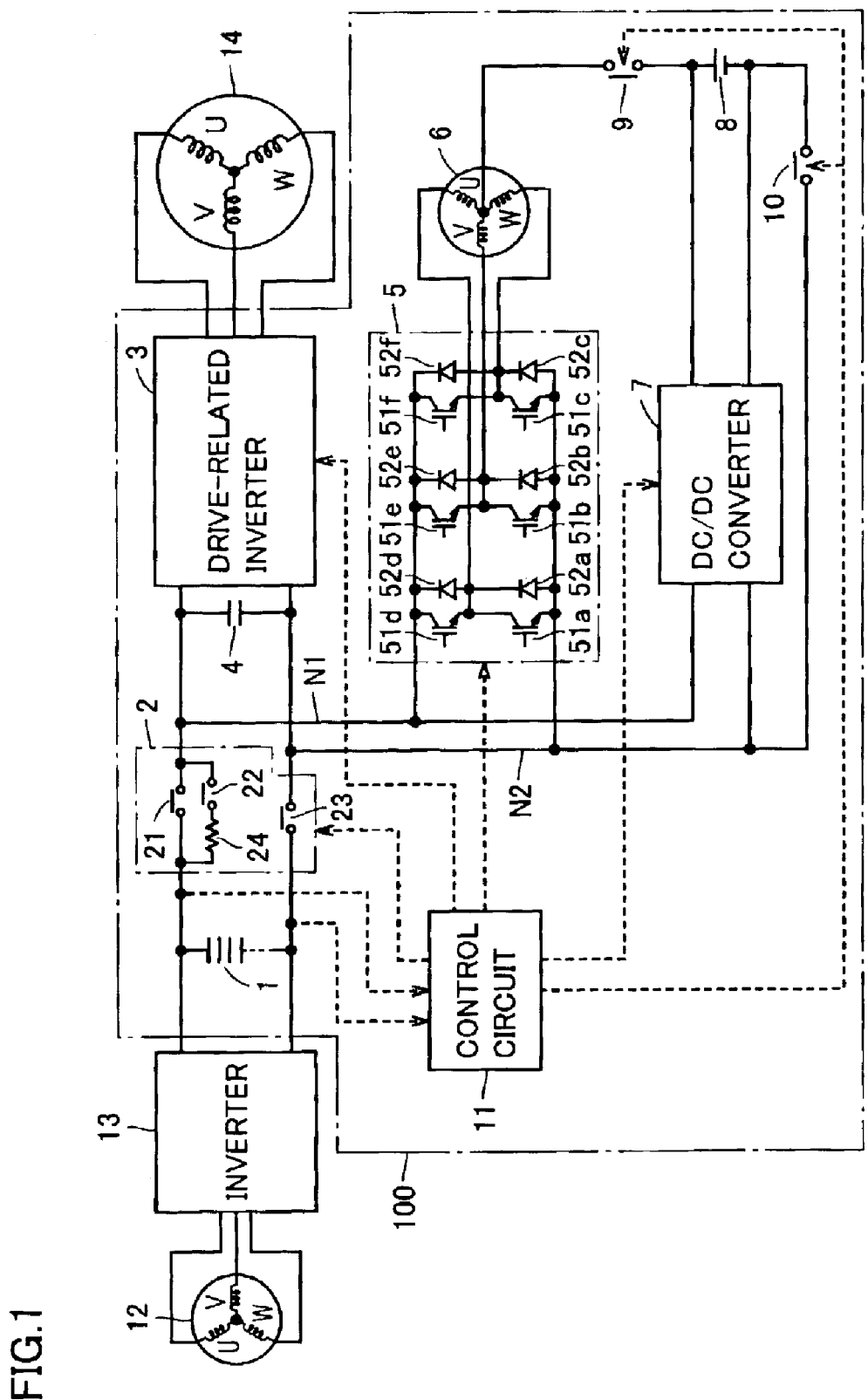
FIG. 1 is a circuit diagram showing a circuit configuration of a load driver according to a first embodiment of the present invention.

Embodiments of the present invention are now described in detail in conjunction with the drawings. It is noted that the same components in the drawings are denoted by the same reference characters and description thereof is not repeated here.

First Embodiment

FIG. 1 is a circuit diagram showing a circuit configuration of a load driver mounted on an HV according to a first embodiment of the present invention.

Referring to FIG. 1, a load driver 100 includes a main power supply 1, a system main relay 2 (hereinafter SMR 2), a drive-related inverter 3, a capacitor 4, an auxiliary-related inverter 5, an auxiliary motor 6, a DC/DC converter 7, an auxiliary battery 8, relays 9 and 10, and a control circuit 11. SMR 2 includes relays 21–23 and a resistor 24. In addition, auxiliary-related inverter 5 includes switching transistors 51a–51f and diodes 52a–52f.

Main power supply 1 is a power capacitor with a large storage capacity for supplying electric power to a drive motor 14 for driving the vehicle, to auxiliary motor 6 which is an auxiliary load and to auxiliary battery 8 serving as a power source for auxiliary components except for auxiliary motor 6.

A power generator 12 is connected to an engine (not shown) for converting a mechanical energy supplied from the engine into an electric energy to supply the electric energy to an inverter 13 and accordingly supply electric power to main power supply 1, drive motor 14, auxiliary motor 6 and auxiliary battery 8.

Inverter 13 converts a three-phase AC voltage which is output from power generator 12 into a DC voltage to supply the DC voltage to main power supply 1 and drive motor 14 for example.

SMR 2 serves as a main relay of the system for connection/disconnection between nodes N1, N2 and main power supply 1. Here, nodes N1 and N2 are power supply lines for providing a power supply voltage to each load. When SMR 2 connects main power supply 1 to nodes N1 and N2 based on a command from control circuit 11, SMR 2 first closes relay 23 and relay 22 connected to the resistor and subsequently closes relay 21 for preventing an inrush current to a smoothing capacitor 4 which is connected at the preceding stage of and in parallel to drive-related inverter 3.

Drive-related inverter 3 is a converting circuit converting the DC voltage from main power supply 1 into a three-phase AC voltage to supply the resultant AC voltage to drive motor 14.

Capacitor 4 connected at the preceding stage of and in parallel to drive-related inverter 3 serves as a smoothing capacitor for alleviating influences on drive-related inverter 3 that are caused by voltage variation.

Auxiliary-related inverter 5 is a converting circuit having switching transistors 51a–51f with switching operation thereof controlled by control circuit 11, for converting the DC voltage from main power supply 1 into a three-phase AC voltage to output the resultant AC voltage to auxiliary motor 6. If an output voltage from main power supply 1 is low at the startup of the system, the switching operation of switching transistors 51a–5c in auxiliary-related inverter 5 is controlled to use a coil of auxiliary motor 6 as a reactor described below for stepping up a voltage from auxiliary battery 8 and accordingly charging main power supply 1.

Auxiliary motor 6 is a three-phase AC motor for the auxiliary that is supplied directly with electric power from main power supply 1, and is an electrically-powered AC compressor (for air conditioner) for example. Auxiliary motor 6 is supplied with the three-phase AC voltage from auxiliary-related inverter 5 and accordingly driven. Respective one-ends of the coils of the phases in auxiliary motor 6 are connected together to form a neutral point which is connected to the positive electrode of auxiliary battery 8 via relay 9. When relay 9 is made ON, a coil of auxiliary motor 6 is used as a reactor for stepping up the voltage supplied from auxiliary battery 8 with auxiliary-related inverter 5, and charging main power supply 1.

DC/DC converter 7 is connected to power supply lines, i.e., nodes N1 and N2 in parallel to drive-related inverter 3 and auxiliary-related inverter 5, for stepping down the DC voltage from main power supply 1 into a predetermined voltage to supply the resultant voltage to auxiliary battery 8. In addition, DC/DC converter 7 steps down, not only the DC voltage from main power supply 1, but also a voltage regeneratively-generated from drive motor 14 in deceleration to provide the resultant voltage to auxiliary battery 8. DC/DC converter 7 is stopped at a command from control circuit 11 when relays 9 and 10 are closed and thus electric power is supplied from auxiliary battery 8 to main power supply 1 via auxiliary motor 6 and auxiliary-related inverter 5.

Auxiliary battery 8 is a battery used for a lamp, a small-sized motor and other auxiliary components and is a secondary battery of low output-voltage. Auxiliary battery 8 is connected to DC/DC converter 7 to be supplied with electric power from main power supply 1 and accordingly charged, and is further charged with electric power regeneratively-generated from drive motor 14 in declaration. In addition, auxiliary battery 8 has its positive electrode connected to the neutral point of auxiliary motor 6 via relay 9 and has its negative electrode connected to node N2 via relay 10. When relays 9 and 10 are closed, a series of circuits is formed from the positive electrode of auxiliary battery 8 to the negative electrode of auxiliary battery 8 through auxiliary motor 6, auxiliary-related inverter 5, node N1, main power supply 1 and node N2. In this way, electric power is supplied from auxiliary battery 8 to main power supply 1.

Relays 9 and 10 are in an opened state for normal operation of load driver 100, and accordingly electric power is supplied to auxiliary battery 8 from nodes N1 and N2 via DC/DC converter 7. If the output voltage of main power supply 1 is low at the startup of the system, relays 9 and 10 are closed at a command from control circuit 11 and auxiliary battery 8 is connected to the neutral point of auxiliary motor 6 and to node N2.

Control circuit 11 is a microcomputer including a CPU (central processing unit), a RAM (random-access memory), a ROM (read-only memory) and an input/output device (not shown), for example. When an ignition key for starting the system of the vehicle is turned to the ON position, control circuit 11 connects main power supply 1 and inverter 13 described below to nodes N1 and N2 by making SMR 2 ON, in order to allow electric power to be supplied from main power supply 1 and inverter 13 to each load. In normal operation, control circuit 11 controls drive-related inverter 3 by PWM (pulse width modulation) in order to cause drive motor 14 to generate torque according to a motor torque command, based on the electric power supplied from main power supply 1 and inverter 13. Control of the motor torque is discussed later herein. Further, control circuit 11 controls auxiliary-related inverter 5 to drive auxiliary motor 6.

When the system is started and SMR 2 is made ON, control circuit 11 receives an output voltage VC of main power supply 1 that is detected by a voltage sensor (not shown). When voltage VC is lower than a predetermined voltage V0 and accordingly control circuit 11 determines that it is impossible to drive loads, control circuit 11 stops drive-related inverter 3 and DC/DC converter 7 and closes relays 9 and 10. Further, in order to step up a voltage from auxiliary battery 8 into a predetermined voltage which is to be supplied to main power supply 1, control circuit 11 turns off switching transistors 51d–51f of auxiliary-related inverter 5 and controls the duty ratio of switching transistors 51a–51c. A step-up chopper is thus formed by auxiliary-related inverter 5 and a coil of auxiliary motor 6 to step up or upconvert the voltage from auxiliary battery 8 and the resultant voltage is provided to main power supply 1.

Switching transistors 51a–51c are appropriately controlled depending on the capacity of auxiliary battery 8 which supplies the electric power as well as the degree of step-up. Specifically, all of the switching transistors 51a–51c may simultaneously be turned on/off, the transistors 51a–51c may separately be turned on/off in cyclic manner, or any of the transistors only may be turned on/off.

When the ignition key is turned to the OFF position and thus control circuit 11 determines that the system is stopped, control circuit 11 makes SMR 2 OFF to disconnect main power supply 1 and inverter 13 from each load.

Drive motor 14 driven by load driver 100 is a three-phase AC induction motor or synchronous motor for driving the vehicle. The motor torque generated from drive motor 14 is transmitted, as drive-shaft torque, to wheels. When the vehicle is decelerated, drive motor 14 is also used as a power generator for supplying a voltage regeneratively generated in deceleration, to main power supply 1, auxiliary motor 6 or auxiliary battery 8, for example.

Figure 2:
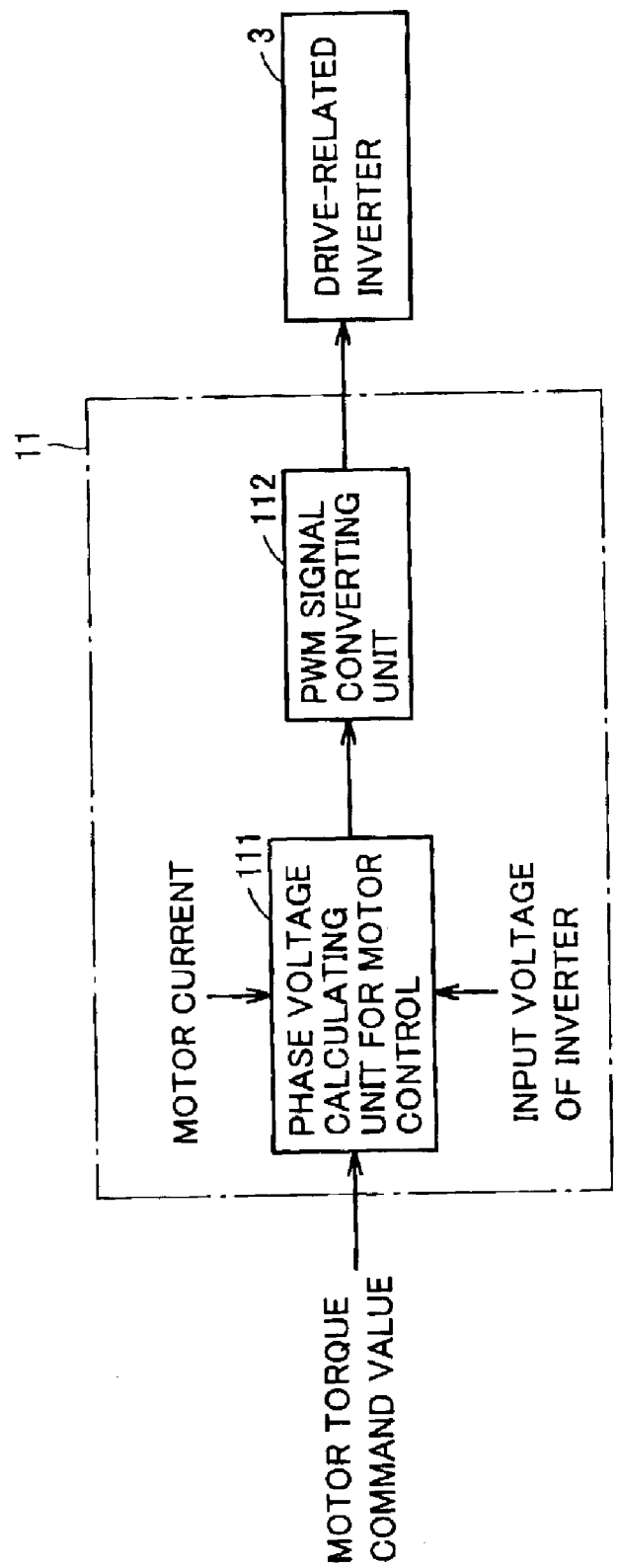
FIG. 2 is a functional block diagram illustrating the function of torque control of a drive motor by a control circuit in the load driver shown in FIG. 1.

FIG. 2 is a functional block diagram illustrating the function of the torque control of drive motor 14 by control circuit 11. Referring to FIG. 2, control circuit 11 includes a phase voltage calculating unit 111 for controlling the motor (hereinafter simply referred to as phase voltage calculating unit 111) and a PWM signal converting unit 112.

Phase voltage calculating unit 111 receives, as its inputs, a motor torque command value, respective electric-current values of the phases of drive motor 14, and an input voltage of drive-related inverter 3 to calculate the voltage of the coil of each phase in drive motor 14, and outputs the resultant voltage to PWM signal converting unit 112.

Here, the motor torque command value is provided as a value of the motor torque necessary for achieving a power requirement calculated from the degree of opening of the accelerator pedal. For a vehicle of the series HV type including the load driver 100, the motor torque command value is provided to allow a necessary drive-shaft torque to be output. For a vehicle of the parallel HV type, the motor torque command value is provided to allow the sum of engine torque and motor torque to be output as the drive-shaft torque.

The electric-current value of each phase of drive motor 14 is detected by a current sensor (not shown) and the input voltage of drive-related inverter 3 is detected by a voltage sensor (not shown).

PWM signal converting unit 112 generates, based on the results of the calculation by phase voltage calculating unit 111, a PWM signal for turning on/off each transistor (not shown) in drive-related inverter 3, and the generated signal is output to drive-related inverter 3.

According to this PWM signal, switching of the transistors each is controlled, the drive current of each phase in drive motor 14 is controlled, and therefore, the motor torque is controlled according to the motor torque command value.

Referring again to FIG. 1, the system is started and accordingly control circuit 11 of load driver 100 issues a command to make SMR 2 ON, and thus electric power is supplied from main power supply 1 to nodes N1 and N2. If output voltage VC of main power supply 1 is equal to or larger than predetermined voltage V0, drive-related inverter 3 receives the DC voltage from main power supply 1 to convert the DC voltage, based on the PWM signal from control circuit 11, into a three-phase AC voltage to output the AC voltage to drive motor 14. Drive motor 14 thus generates torque according to the command. Further, auxiliary-related inverter 5 and DC/DC converter 7 also receive the DC voltage from main power supply 1. Based on the command from control circuit 11, auxiliary-related inverter 5 converts the supplied DC voltage into a three-phase AC voltage for driving auxiliary motor 6 while DC/DC converter 7 steps down the supplied DC voltage for charging auxiliary battery 8.

After the system is started and then SMR 2 is made ON, if output voltage VC from main power supply 1 is too small and thus insufficient to drive the load, relays 9 and 10 are closed at a command from control circuit 11 so that auxiliary battery 8 is connected to the neutral point of auxiliary motor 6 and to node N2. Then, based on the command from control circuit 11, drive-related inverter 3 and DC/DC converter 7 are stopped and, for auxiliary-related inverter 5, the duty ratio of switching transistors 51a–51c is controlled and switching transistors 51d–51f are turned off by control circuit 11. In this way, auxiliary-related inverter 5 and a coil of auxiliary motor 6 that is used as a reactor constitute the step-up chopper. Auxiliary-related inverter 5 steps up the voltage supplied from auxiliary battery 8 to output the resultant voltage for charging main power supply 1.

When control circuit 11 determines that terminal-to-terminal voltage VC of main power supply 1 reaches voltage V1 which is sufficient to drive the load, relays 9 and 10 are opened at a command from control circuit 11, and auxiliary-related inverter 5, drive-related inverter 3 and DC/DC converter 7 carry out normal operation according to a command from control circuit 11.

Figure 3:
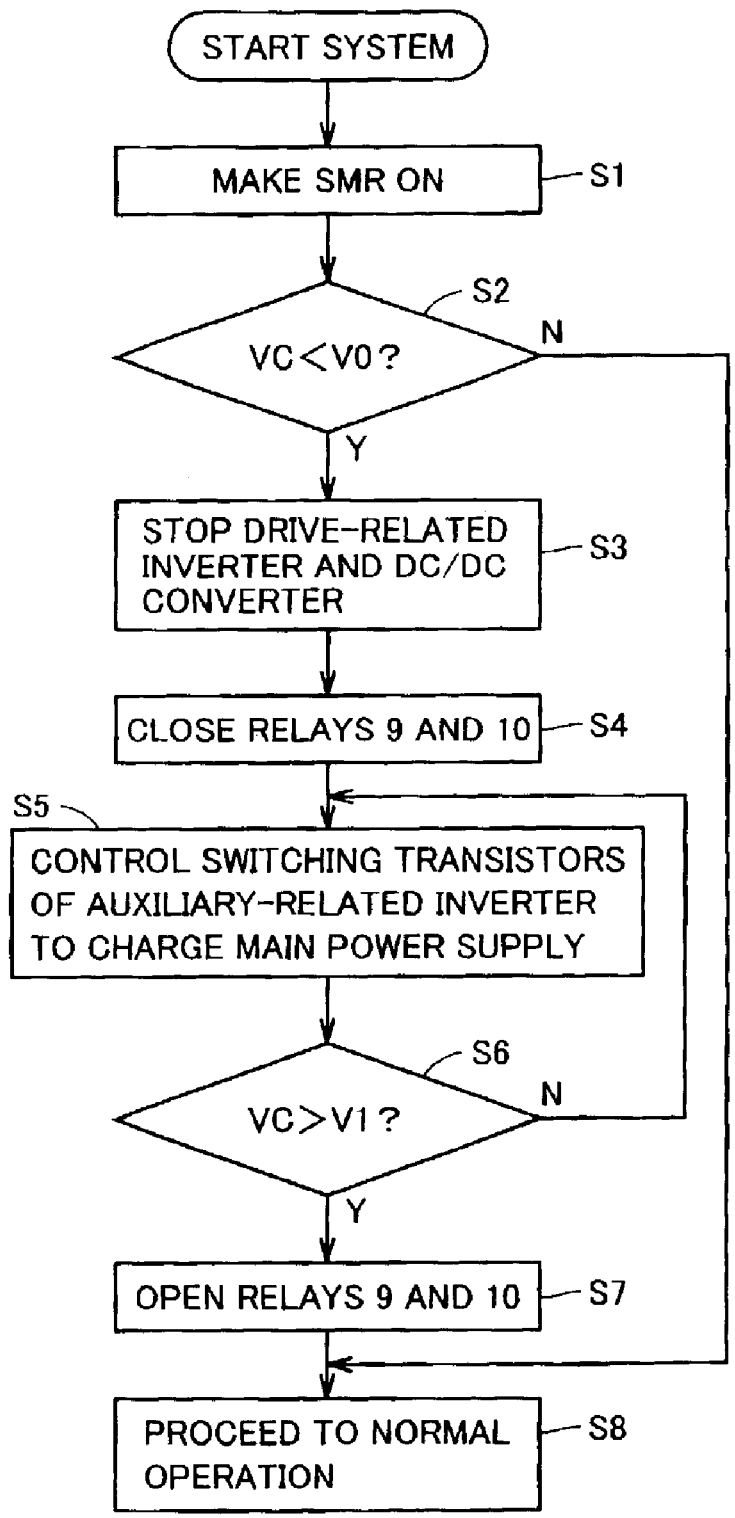
FIG. 3 is a flowchart illustrating a process followed after the startup of the system by the control circuit in the load driver shown in FIG. 1.

FIG. 3 is a flowchart illustrating a process followed by control circuit 11 of load driver 100 after the startup of the system. Referring to FIG. 3, the system is started and then control circuit 11 makes SMR 2 ON according to the above-described sequence (step S1). Then, control circuit 11 detects output voltage VC of main power supply 1 to check whether or not voltage VC is smaller than predetermined voltage V0 which is sufficient to drive the load (step S2). If control circuit 11 determines that voltage VC is smaller than voltage V0, control circuit 11 stops drive-related inverter 3 and DC/DC converter 7 by supplying no operation command thereto (step S3) and closes relays 9 and 10 (step S4). Control circuit 11 then turns off switching transistors 51d–51f and controls the duty ratio of switching transistors 51a–51c of auxiliary-related inverter 5 for stepping up the voltage from auxiliary battery 8 and accordingly charging main power supply 1 (step S5).

If control circuit 11 determines that voltage VC of main power supply 1 exceeds predetermined voltage V1 by which sufficient electric power can be supplied to each load (step S6), control circuit 11 opens relays 9 and 10 (step S7) to proceed to a normal operation for driving each load by the electric power supplied from main power supply 1 (step S8). If control circuit 11 determines in step S6 that voltage VC is still smaller than voltage V1 and thus main power supply 1 has not been charged to a sufficient degree, the process returns to step S5.

After the startup of the system, if control circuit 11 determines in step S2 that output voltage VC of main power supply 1 is equal to or larger than voltage V0, the control circuit 11 determines that main power supply 1 is sufficiently charged with electric power to proceed to step S8.

It is noted that predetermined voltages V0 and V1 mentioned above may be equal to each other, or V0 may be smaller than V1 (V0<V1) for preventing chatter of relays 9 and 10 at or near voltage V0 that is caused by voltage variation.

The above-discussed load driver 100 is applicable to the HV of any of series type, parallel type and series-parallel type. In addition, the application of the load driver is not limited to the HV and the load driver is similarly applicable to the EV.

Moreover, the above-discussed main power supply 1 may finally function as a power storage unit which can output the DC voltage, and may be a secondary battery, for example.

According to the description above, load driver 100 is mounted on the HV and thus the ignition key is used as a switch for starting the system. However, if the load driver is mounted on the EV, a start permission switch is used instead of the ignition key.

As heretofore discussed, the load driver 100 of the first embodiment connects auxiliary-related battery 8 to the neutral point of auxiliary motor 6 and to the negative electrode of main power supply 1, when the output voltage of main power supply 1 is insufficient at the startup of the system, and auxiliary-related inverter 5 uses the coils of auxiliary motor 6 to step up the output voltage from auxiliary battery 8 and accordingly charge main power supply 1. The main power supply 1 is thus charged at low cost without the need for a separate step-up unit or high-performance step-up/step-down DC/DC converter.

Second Embodiment

The positive electrode of auxiliary battery 8 is connected to the neutral point of auxiliary motor 6 according to the first embodiment. According to a second embodiment, the positive electrode of auxiliary battery 8 is connected to the other end of any of coils in auxiliary motor 6.

Figure 4:
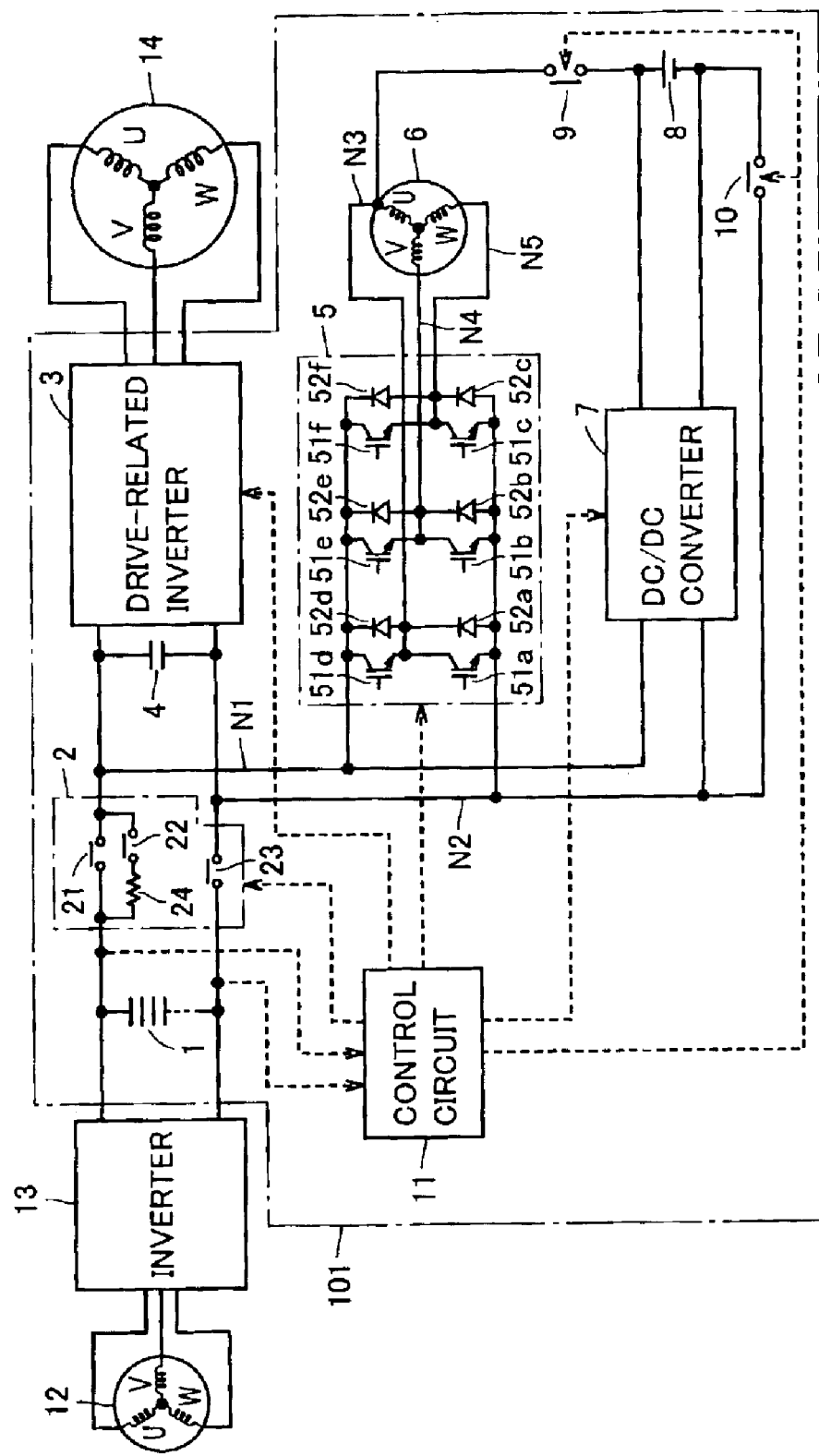
FIG. 4 is a circuit diagram showing a circuit configuration of a load driver according to a second embodiment of the present invention.

FIG. 4 is a circuit diagram showing a circuit configuration of a load driver mounted on an HV according to the second embodiment.

Referring to FIG. 4, in load driver 101, the positive electrode of auxiliary battery 8 is connected via relay 9 to one-end (node N3) of the coil of U-phase that does not constitute the neutral point of auxiliary motor 6. Except for this, the structure is the same as that of the above-described load driver 100 of the first embodiment. Accordingly, two coils of auxiliary motor 6 are available as reactors for stepping up the voltage from auxiliary battery 8 thereby charging main power supply 1 by means of auxiliary-related inverter 5 and auxiliary motor 6, and thus the step-up function is improved.

When control circuit 11 of load driver 101 determines, after the system is started and SMR 2 is made ON, that output voltage VC of main power supply 1 decreases to such a degree that the load cannot be driven by the output voltage VC, relays 9 and 10 are closed at a command from control circuit 11, the positive electrode of auxiliary battery 8 is connected to node N3 of the U-phase line of auxiliary motor 6 and the negative electrode thereof is connected to node N2. At a command from control circuit 11, drive-related inverter 3 and DC/DC converter 7 are stopped, and the duty ratio of only the switching transistor 51b in auxiliary-related inverter 5 is controlled by control circuit 11 while other switching transistors 51a and 51c–51f are turned off. In this way, a step-up chopper is constituted by auxiliary-related inverter 5 and the two coils respectively of U-phase and V-phase of auxiliary motor 6 that are used as reactors, and auxiliary-related inverter 5 steps up the voltage from auxiliary battery 8 and outputs the resultant voltage for charging main power supply 1.

The duty ratio of only the switching transistor 51c of auxiliary-related inverter 5 may be controlled by control circuit 11 while other switching transistors 51a, 51b and 51d–51f are turned off. In this case, auxiliary-related inverter 5 uses, as reactors, two coils respectively of U-phase and W-phase of auxiliary motor 6.

If control circuit 11 determines that terminal-to-terminal voltage VC of main power supply 1 is charged to voltage V1 which is enough to drive the load, relays 9 and 10 are opened at a command from control circuit 11 and auxiliary-related inverter 5, drive-related inverter 3 and DC/DC converter 7 perform normal operation at a command from control circuit 11.

According to the description above, the positive electrode of auxiliary battery 8 is connected to node N3 of the U-phase line of auxiliary motor 6. Alternatively, the positive electrode of auxiliary battery 8 may be connected to node N4 of the V-phase line or node N5 of the W-phase line of auxiliary motor 6. If the positive electrode of auxiliary battery 8 is connected to node N4, the control circuit 11 controls the duty ratio of one of switching transistors 51a and 51c of auxiliary-related inverter 5 while other switching transistors are turned off. If the positive electrode of auxiliary battery 8 is connected to node N5, control circuit 11 controls the duty ratio of one of switching transistors 51a and 51b of auxiliary-related inverter 5 while other switching transistors are turned off.

By load driver 101 of the second embodiment as discussed above, the main power supply is charged without the need for a separate step-up unit or high-performance step-up/step-down converter, as accomplished according to the first embodiment. In addition, the step-up function is enhanced by using the structure with two coils of auxiliary motor 6 for stepping up.

Third Embodiment

A load driver according to a third embodiment includes two sets of auxiliary-related inverters and auxiliary motors with an auxiliary battery connected to respective neutral points of these auxiliary motors for charging the main power supply 1.

Figure 5:
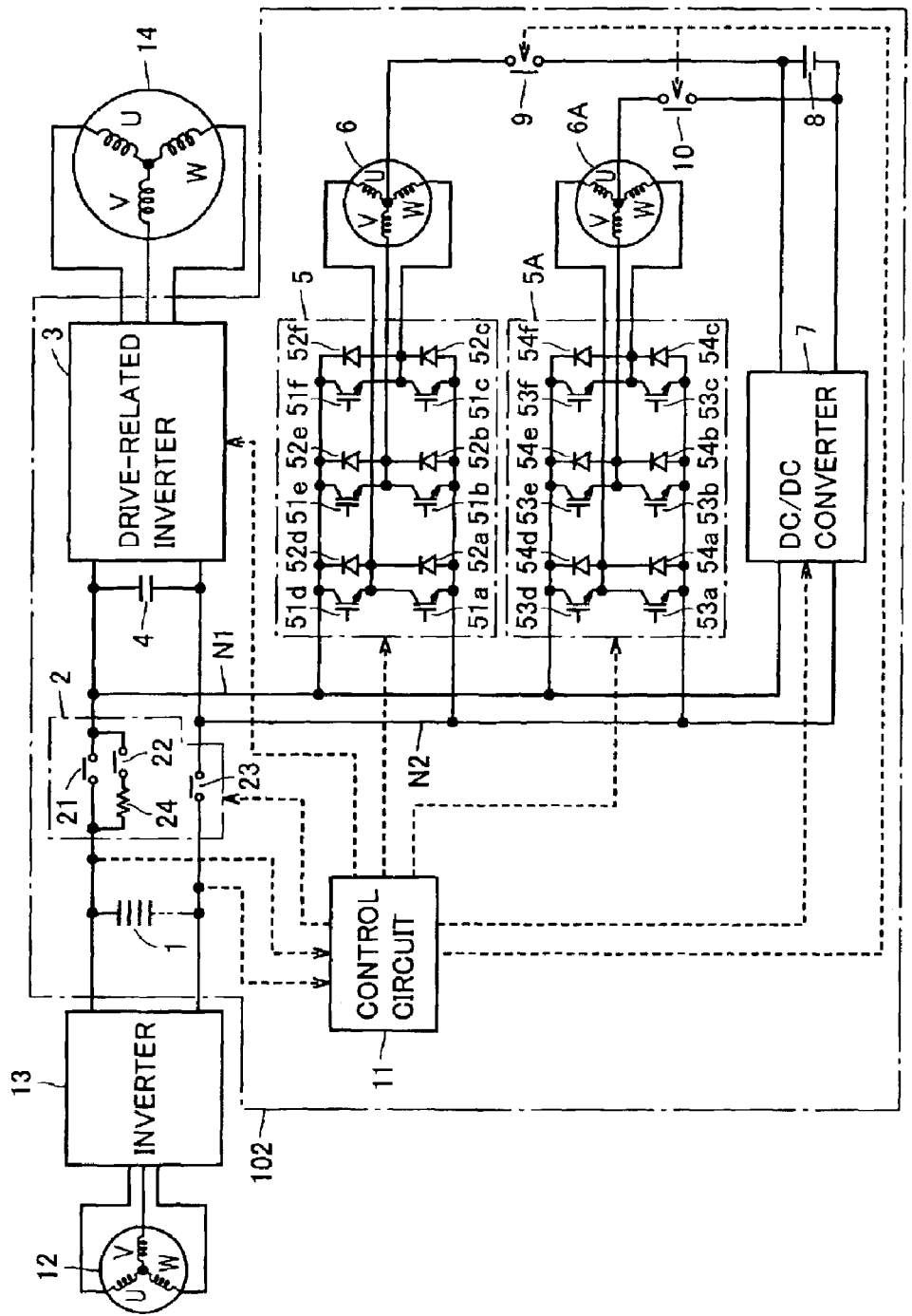
FIG. 5 is a circuit diagram showing a circuit configuration of a load driver according to a third embodiment of the present invention.

FIG. 5 is a circuit diagram showing a circuit configuration of the load driver mounted on an HV according to the third embodiment.

Referring to FIG. 5, load driver 102 includes a main power supply 1, an SMR 2, a drive-related inverter 3, a capacitor 4, an auxiliary-related inverter 5, an auxiliary motor 6, a DC/DC converter 7, an auxiliary battery 8, and relays 9 and 10 as the circuit of the first embodiment discussed above.

Load driver 102 further includes an auxiliary-related inverter 5A and an auxiliary motor 6A. In addition, auxiliary-related inverter 5A includes switching transistors 53a–53f and diodes 54a–54f.

In auxiliary-related inverter 5A, the switching operation of switching transistors 53a–53f is controlled by control circuit 11, auxiliary-related inverter 5A converts a DC voltage supplied from main power supply 1 into a three-phase AC voltage and outputs the resultant AC voltage to auxiliary motor 6A. When the output voltage from main power supply 1 decreases and is thus insufficient at the startup of the system, auxiliary-related inverter 5A is connected via relay 10 to the negative electrode of auxiliary battery 8, and all of the switching transistors 53a–53f of auxiliary-related inverter 5A are turned off for allowing electric current to flow from node N2 to auxiliary motor 6A via diodes 54a–54c.

Auxiliary motor 6A is another three-phase AC motor like auxiliary motor 6 that is supplied with electric power directly from main power supply 1. Auxiliary motor 6A is driven by being supplied with a three-phase AC voltage from auxiliary-related inverter 5A. One-ends of respective coils of the phases of auxiliary motor 6A are connected together to form a neutral point which is connected via relay 10 to the negative electrode of auxiliary battery 8. When relay 10 is made ON, auxiliary motor 6A supplies electric current from auxiliary-related inverter 5A, from the neutral point thereof, to the negative electrode of auxiliary battery 8.

As described in connection with the first embodiment, when main power supply 1 is charged with power from auxiliary battery 8, control circuit 11 turns off switching transistors 51d–51f of auxiliary-related inverter 5, controls the duty ratio of switching transistors 51a–51c and turns off all of the switching transistors 53a–53f of auxiliary-related inverter 5A.

As for load driver 102, after the system is started and then SMR 2 is made ON, if control circuit 11 determines that output voltage VC of main power supply 1 decreases to such a degree that output voltage VC cannot drive the load, relays 9 and 10 are closed at a command from control circuit 11 and respective neutral points of auxiliary motors 6 and 6A are connected to the positive and negative electrodes respectively of auxiliary battery 8. Control circuit 11 controls the duty radio of switching transistors 51a–51c of auxiliary-related inverter 5, and auxiliary-related inverter 5 and auxiliary motor 6 step up the voltage from auxiliary battery 8 for charging main power supply 1, which is similarly accomplished in the first embodiment as described above. Auxiliary-related inverter 5A with its switching transistors 53a–53f all turned off serves to constitute circuitry between auxiliary battery 8 and main power supply 1. Specifically, according to the third embodiment, a series of circuits is formed between auxiliary battery 8 and main power supply 1, from the positive electrode of auxiliary battery 8, auxiliary motor 6, auxiliary-related inverter 5, node N1, main power supply 1, node N2, auxiliary-related inverter 5A (diodes 54a–54c), auxiliary motor 6A and the negative electrode of auxiliary battery 8.

Other details concerning the operation of load driver 102 are similar to those of load driver 100 of the first embodiment, and description thereof is not repeated here.

According to the description above, auxiliary battery 8 is connected via relays 9 and 10 to the neutral points respectively of auxiliary motors 6 and 6A. Alternatively, as the second embodiment associated with the first embodiment, auxiliary battery 8 may be connected to one-end, which does not constitute the neutral point, of any coil of auxiliary motor 6 and that of auxiliary motor 6A. Switching transistors of auxiliary inverter 5 in this case operate as described in connection with the second embodiment.

Such a load driver as that of the third embodiment having two auxiliary-related inverters may connect an external commercial power supply (not shown) to respective neutral points of auxiliary motors 6 and 6A to appropriately control switching of auxiliary-related inverter 5 and that of auxiliary-related inverter 5A alternately in synchronization with the phase of a supplied AC voltage. Accordingly, it is also possible to convert an AC voltage from the external commercial power supply into a DC voltage and step up the DC voltage for charging main power supply 1.

As heretofore discussed, load driver 102 of the third embodiment charges the main power supply at low cost without the need for a separate step-up unit or high-performance step-up/step-down DC/DC converter, as accomplished in the first embodiment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A load driver, comprising:

an AC motor;

a first power supply outputting a first voltage which is a DC voltage;

a second power supply outputting a second voltage which is a DC voltage;

an inverter receiving said first voltage, converting said first voltage into an AC voltage, outputting said AC voltage to said AC motor, and driving said AC motor;

a converter stepping down said first voltage, outputting the step-down voltage to said second power supply and charging said second power supply; and a control circuit, wherein when said first voltage is lower than a predetermined voltage, said second voltage is supplied to a coil of said AC motor, and said control circuit controls said inverter to step up said second voltage by said coil of said AC motor and said inverter, outputs the step-up voltage to said first power supply and charges said first power supply, and stops said converter, and said AC motor includes a plurality of coils each having one end and the other end, respective one-ends of all of said plurality of coils being connected together to a neutral point of said coils, and said second voltage is supplied to the other end of one of said plurality of coils.

2. The load driver according to claim 1, further comprising another inverter receiving said first voltage, converting said first voltage into another AC voltage, and outputting said another AC voltage to and driving a vehicle-drive motor for moving a vehicle, wherein said AC motor is a motor for auxiliary components, and when said first voltage is lower than said predetermined voltage, said control circuit further stops said another inverter.

3. The load driver according to claim 1, wherein said first power supply is one of a power capacitor and a secondary battery.

4. The load driver according to claim 1, wherein when said first power supply needs to be charged at system startup, said control circuit controls said inverter to step up said second voltage by said coil of said AC motor and said inverter, output the step-up voltage to said first power supply and charge said first power supply, and stops said converter.

5. A load driver, comprising:

a first AC motor;

a second AC motor;

a first power supply outputting a first voltage which is a DC voltage;

a second power supply outputting a second voltage which is a DC voltage;

a first inverter receiving said first voltage, converting said first voltage into a first AC voltage, outputting said first AC voltage to said first AC motor, and driving said first AC motor;

a second inverter receiving said first voltage, converting said first voltage into a second AC voltage, outputting said second AC voltage to said second AC motor, and driving said second AC motor;

a converter stepping down said first voltage, outputting the step-down voltage to said second power supply and charging said second power supply; and a control circuit, wherein when said first voltage is lower than a predetermined voltage, the positive electrode of said second power supply is connected to a coil of said first AC motor, and the negative electrode of said second power supply is connected to a coil of said second AC motor, and said control circuit controls said first inverter to step up said second voltage by said coils of said first and second AC motors and said first and second inverters, outputs the step-up voltage to said first power supply, and charges said first power supply.

6. The load driver according to claim 5, wherein the positive electrode of said second power supply is connected to a first neutral point of all coils of said first AC motor, the negative electrode of said second power supply is connected to a second neutral point of all coils of said second AC motor.

7. The load driver according to claim 5, wherein said first power supply is one of a power capacitor and a secondary battery.

8. The load driver according to claim 5, wherein when said first power supply needs to be charged at system startup, said control circuit controls said first inverter to step up said second voltage by said coils of said first and second AC motors and said first and second inverters, output the step-up voltage to said first power supply and charge said first power supply, and stops said converter.

* * * * *